United States Patent [19]

Giles, Jr.

[11] Patent Number: 4,639,481

[45] Date of Patent: Jan. 27, 1987

[54] MODIFIED THERMOPLASTIC POLYESTER MOLDING COMPOSITIONS AND ARTICLES MOLDED THEREFROM

[75] Inventor: Harold F. Giles, Jr., Cheshire, Mass.

[73] Assignee: General Electric Company, Pittsfield, Mass.

[21] Appl. No.: 721,340

[22] Filed: Apr. 9, 1985

Related U.S. Application Data

[62] Division of Ser. No. 424,266, Sep. 27, 1982, abandoned.

[51] Int. Cl.$^4$ .............................................. C08L 69/00
[52] U.S. Cl. .................................... 524/128; 525/146; 525/148
[58] Field of Search ............... 525/133, 146, 148, 439, 525/67; 524/128

[56] References Cited

U.S. PATENT DOCUMENTS

| | | | |
|---|---|---|---|
| 3,218,372 | 11/1965 | Okamura | 525/439 |
| 3,431,224 | 3/1969 | Goldblum | 260/13 |
| 3,437,631 | 4/1969 | Cleveland | 2/410 |
| 3,864,428 | 2/1975 | Nakamura | 525/67 |
| 4,122,061 | 10/1978 | Holub | 524/513 |
| 4,141,863 | 2/1979 | Coran et al. | 260/3 |
| 4,172,859 | 10/1979 | Epstein | 525/109 |
| 4,226,950 | 10/1980 | Holub et al. | 525/67 |
| 4,251,644 | 2/1981 | Joffrion | 525/64 |
| 4,260,690 | 4/1981 | Binsack | 525/64 |
| 4,358,563 | 11/1982 | Quinn | 525/146 |
| 4,440,889 | 4/1984 | Hergenrother et al. | 524/143 |
| 4,493,921 | 1/1985 | Wefer | 525/67 |

FOREIGN PATENT DOCUMENTS

57-108152 7/1982 Japan.
57-153041 9/1982 Japan.

*Primary Examiner*—John C. Bleutge
*Assistant Examiner*—Patricia Short
*Attorney, Agent, or Firm*—Richard J. Traverso; William F. Mufatti; Edward K. Welch, II

[57] ABSTRACT

Thermoplastic molding compositions which comprise (a) a poly($C_{2-6}$alkylene terephthalate) resin and a major proportion of (b) an aromatic polycarbonate resin with (c) a polyolefin resin or an olefin copolymer, provide molded articles of improved impact resistance. In preferred embodiments, articles molded from the compositions possess improved impact resistance, lower specific gravity, good tensile strength, and improved resistance to distortion at elevated temperatures under load.

8 Claims, No Drawings

MODIFIED THERMOPLASTIC POLYESTER MOLDING COMPOSITIONS AND ARTICLES MOLDED THEREFROM

This is a division of application Ser. No. 424,266 filed Sept. 27, 1982, now abandoned.

BACKGROUND OF THE INVENTION

The present invention relates to modified thermoplastic poly($C_{2-6}$alkylene terephthalate) molding compositions which in preferred instances provide molded articles possessing improved impact resistance, lower specific gravity improved resistance to distortion under load, and improved surface appearance. More particularly, the invention relates to compositions of (a) a ($C_{2-6}$ alkylene terephthalate) resin, and a major proportion of (b) an aromatic polycarbonate resin combined with (c) a polyolefin or an olefin copolymer.

The invention includes articles molded from the composition.

High molecular weight linear polyesters of $C_{2-4}$ glycols with terephthalic acid (and isophthalic acid and other similar dibasic acids) have been available for many years. Certain of these are described in Whinfield et al. U.S. Pat. No. 2,465,319, and in Pengilly, U.S. Pat. No. 3,047,539, incorporated herein by reference.

With the development of molecular weight control, the use of nucleating agents and two-step molding cycles polyethylene terephthalate and, in general, the poly($C_{2-6}$ alkylene terephthalate) resins have become important constituents of injection moldable compositions. Poly(1,4-butylene terephthalate), because of its very rapid crystallization from the melt, is uniquely useful as a component of such compositions. Workpieces molded from such polyester resins, alone or combined with reinforcements, in comparison with other thermoplastics possess a high degree of surface hardness, abrasion resistance and gloss, and a low degree of surface friction.

Stable polyblends of poly(1,4-butylene terephthalate) and polyethylene terephthalate can be molded into useful unreinforced and reinforced articles. See Fox and Wambach U.S. Pat. No.3,953,394, incorporated herein by reference.

Block copolyesters containing units derived from poly(1,4-butylene terephthalate) and from an aromatic aliphatic or aliphatic polyester are also known. See copending application U.S. Ser. No. 752,325, filed Dec. 20, 1976, incorporated herein by reference. Such block copolyesters are useful alone as molding resins and also in intimate combination with poly(1,4-butylene terephthalate) and/or polyethylene terephthalate.

Polycarbonates are known to be admixable with various polyesters, including poly(alkylene terephthalates). Such blends are often more cost effective than the polycarbonate alone. Compositions of polycarbonate resins and polyester are disclosed, for instance, in U.S. Pat. No. 3,864,428 (Nakamura, et al.).

Bussink et al. in U.S. Pat. No. 4,267,096 disclose compositions comprising a selectively hydrogenated elastomeric block copolymer, a polycarbonate and an amorphous polyester. These compositions are described as having improved melt flow and resistance to brittle failure and environmental stress cracking.

Dieck et al. in U.S. Pat. No. 4,220,735 disclose thermoplastic compositions of poly(1,4-butylene terephthalate) resin in combination with poly(ethylene terephthalate) and/or a polyester copolymer and a modifier comprising both a selectively hydrogenated monoalkenyl arene-diene block copolymer and an aromatic polycarbonate.

It has been proposed to increase the impact strengths of such polyesters by adding modifiers. For example, Brinkmann et al. in U.S. Pat. No. 3,591,659 disclose that a useful family of modifiers comprises polyalkyl acrylates, methacrylates and/or ethacrylates. Baron et al. in U.S. Pat. No. 4,044,073 disclose that a useful impact modifier for such polyesters is an aromatic polycarbonate. Schlichting et al. in U.S. Pat. No. 4,022,748 disclose that a rubber-elastic graft co-polymer having a glass temperature below $-20°$ C. is a useful modifier. Lane, U.S. Pat. No. 4,034,013 and Farnham et al., U.S. Pat. No. 4,096,202 disclose that useful impact modifiers comprise multiple-stage polymers having a rubbery first stage and a hard final stage, preferably including units derived from alkyl acrylates, especially the butyl acrylates. Baron et al. in U.S. Pat. No. 4,034,016 disclose an impact modifier combination comprising a blend of polyurethane and an aromatic polcarbonate. Co-pending application Ser. No. 870,679 filed Jan. 19, 1978, now U.S. Pat. No. 4,203,887, discloses an impact modifier combination comprising a segmented block copolyester and an aromatic polycarbonate. and Cohen et al. co-pending application Ser. No. 957,801, now U.S. Pat. No. 4,257,937, discloses combinations of polyarylate resins and aromatic polycarbonate resins for the purpose. Reinforced, filled and/or flame retardant modifications of such polyesters are also well-known in the art.

It has now been discovered that molding compositions comprising a minor amount of poly($C_{2-6}$alkylene terephthalate) resin, including copolyesters thereof, provide moldings of improved impact resistance, flexural and tensile strength and resistance to distortion at elevated temperature under load, as well as lower specific gravity, improved compatibility without delamination and improved surface appearance, when the compositions include an intimate admixture of a polycarbonate resin and a polyolefinic or olefin copolymer resin.

DESCRIPTION OF THE INVENTION

The invention provides thermoplastic molding compositions comprising (a) a minor amount of a poly($C_{2-6}$alkylene terephthalate) resin and a major proportion of (b) an aromatic polycarbonate resin; in combination with (c) a polyolefin or an olefin copolymer, the amount of (b) and (c) being effective to increase the impact strength of articles molded from said resins (a) and (b).

The polyester resins (a) of the composition of the present invention are available commercially. They can be prepared by known methods such as the alcoholysis of dimethyl terephthalate with an appropriate diol (for example, ethylene glycol and 1,4-butanediol) followed by polymerization, or by reacting the acid or its mono- or di-halide with an appropriate diol or mixture of diols. Copolyesters can be prepared in similar manner by replacement of parts of the terephthalate component with another suitable acid component, for example, isophthalic acid. Suitable methods are described in U.S. Pat. No.2,465,319 and U.S. Pat. No. 3,047,539.

Illustratively, suitable high molecular weight polyesters have an intrinsic viscosity of at least about 0.2 deciliter per gram and preferably at least 0.4 up to 1.5 deciliters per gram as measured in a 60:40 phenol:tetrachloroethane mixture at 30° C. for poly(ethylene terephthalate).

As explained, the compositions of the invention will also contain a poly(ethylene terephthalate) resin as the only polyester in the compositions. Especially preferred is poly(ethylene terephthalate) having an intrinsic viscosity of at least 0.2, and more usually from 0.4 to 1.5 deciliters per gram measured in solution in 60:40 phenol/tetrachloroethane at 25° to 30° C.

Procedures for preparing the poly(ethylene terephthalate) are known to those skilled in the art. The descriptions in U.S. Pat. No. 2,465,319 (to Whinfield, et al.) and U.S. Pat. No. 3,047,539 (to Pengilly) are helpful.

The addition polymer, component (c), can be any normally thermoplastic polyolefin or olefin copolymer. Suitable polymers are the commercial low density polyethylenes (for example, USI Chemical's Microthene FM 510), rubbery copolymers of ethylene and propylene (Epcar 306-G); copolymers of ethylene and methyl acrylate (Gulf's EMA 2205); and EPDM (Nordel 1560 from E.I. DuPont de Nemours).

The aromatic polycarbonate resins which are suitable for use as component (b) are well known, and many suitable resins of this group are disclosed in Encyclopedia of Polymer Science and Technology, Vol. 10, pages 710-727, 1969 Interscience, New York and in Baron et al., U.S. Pat. No. 4,034,016, all incorporated herein by reference. The polycarbonates are produced by reaction of a suitable dihydric phenol compound with phosgene. The reaction is continued until a polycarbonate resin is formed. Because of its ready availability, the ease with which it reacts with phosgene and the very satisfactory properties which it provides in polymerized form, bisphenol-A is preferred as the starting dihydric phenol compound. A suitable aromatic polycarbonate is available under the trademark LEXAN® from General Electric Co.

Among the preferred features the composition is formulated to contain from about 51 to about 97 parts by weight of (b), from about 3 to about 49 parts by weight of (a), and from about 3 to about 20 parts by weight of (c).

In preferred embodiments the composition includes reinforcing fillers such as fibrous (filamentous) glass and/or graphite; mineral fillers such as mica, talc and the like, and preferably, clay. The filamentous glass suitable for use as reinforcement in such embodiments is well known to those skilled in the art and is available from a number of manufacturers. Examples include filaments of a lime-aluminum boro-silicate glass that is substantially soda-free, known as "E" glass; and low soda glass known as "C" glass. These can be untreated or treated with silane.

The amount of the filler varies widely depending on the strength specifications which are to be met, it being essential only that an amount is employed which is at least sufficient to provide some reinforcement. Preferably, however, the weight of the reinforcing fibers is between 1% and 60% of the combined weight of filler and the resinous components of the mixture.

The impact modified polyesters, with and without fibrous reinforcement and filler, can be rendered flame retardant with an effective amount of a conventional flame retardant agent. Examples include a brominated polystyrene, decabromobiphenyl ethane, bis(tetrabromophthalimide) ethane, pentabromoethylbenzene, 1,2-bis(2,4,6-tribromophthalic anhydride, tetrabromobisphenol-A di-2-hydroxyethyl ether, and the like. In the most preferred cases, the flame retardant agent will be a halogenated polycarbonate, and especially a halogenated bisphenol-A homopolymer or copolymer. These polymers can be derived, for instance, from chlorinated or brominated bisphenol-A, preferred examples being tetrabromo bisphenol-A polycarbonate and tetrachloro bisphenol-A polycarbonate, tetrabromo or tetrachloro bis-phenol-A copolycarbonate, statistical mixtures of halogenated bisphenol-A polycarbonates, including chloro-bromo bisphenol-A polycarbonates, and so forth. Processes for preparing such polymers are well documented in the prior art.

Generally, the flame retardant agent will be included in amounts of at least about 5 and more normally from about 10 to about 40 percent of the total weight of the composition.

The compositions can also contain supplementary non-resinous ingredients to improve other chemical and physical properties of the moldings. The additives are selected from among those normally employed in polycarbonate and/or polyester molding compositions, including melt and/or ultraviolet light stabilizers, drip retardants, reinforcing fibers, mineral fillers, dyes, pigments, plasticizers, mold release agents, etc.

Special mention is made of compositions according to this invention which also include from about 0.01 to about 0.5 wt. % of an organic phosphite, e.g., trisnonylphenylphosphite. These are especially processable at high temperatures.

The molding compositions of this invention can be prepared by a number of procedures. In one way, the modifier and any reinforcement (e.g., glass fibers), filler material, fire retardant and other components are put into an extrusion compounder with the resinous components to produce molding pellets. As a result, the modifier and the other components when present are dispersed in a matrix of the resin. In another procedure, the modifier is mixed with the resins by dry tumbling and then the mixture is either fluxed on a mill and comminuted or extruded to form strands which are then chopped. The modifying agents can also be mixed with the resins and directly molded by injection, extrusion or transfer molding or by any other conventional method.

In addition, it is desirable that the duration of the compounding step should be short to prevent degradation of the polymers and other components. The temperature should be controlled below the polymer degradation point and the heat of friction should be taken into account, the object being to form an intimate mixture among the structural resin component (b) and the modifying polymers (a) and (c).

Best results are usually obtained when the ingredients are pre-compounded, pelletized and then molded. Pre-compounding can be carried out in conventional equipment. For example, after the components have been thoroughly dried as described, a single-screw extruder is fed with a dry mixture of the ingredients, the screw employed having a long transition section to ensure proper melting. On the other hand, a twin-screw extrusion machine, e.g. a 28-mm. Werner-Pfleiderer machine, can be fed with resin and additives at the feed port and with reinforcement through a downstream port. In either case, a generally suitable machine temperature is between about 450° and 600° F. depending on the melting point of the poly(alkylene terephthalate) in the composition.

The compounded composition can be extruded and cut up into molding compounds such as conventional granules, pellets and other shapes by standard techniques.

The composition can be molded in any equipment which is suitable for the molding of fiber-reinforced thermoplastic compositions. e.g., a Newbury-type injection molding machine with conventional cylinder temperatures (450°-600° F.) and conventional mold temperatures (150°-200° F.), the molding temperature being such that the resinous components reach their fusion point.

The invention is further illustrated by the examples which follow. These examples are best embodiments of the invention, and the invention is not to be construed in limitation thereof. Parts are by weight except where otherwise stated.

EXAMPLES 1-6

The following illustrate the effect of, in one case, the combination of a rubbery ethylene-propylene polymer and an aromatic polycarbonate, and in another case, the combination of a rubbery ethylene-propylenediene polymer (EPDM) and an aromatic polycarbonate in improving the impact strength of a poly($C_{2-6}$alkylene terephthalate) resin molding.

Test blends were prepared using 40 parts of poly(ethylene terephthalate), 60 parts of poly(bisphenol-A carbonate) resin (LEXAN ®141, General Electric Co.) and various amounts of the ethylene-propylene polymer (Epcar ® 306-G, B.F. Goodrich Co.) or ethylene-propylene-diene polymer (Nordel ®1560, DuPont Co.) as shown below.

All components were tumble mixed until a uniform composition was obtained. The composition was extruded at 500°-530° F. The extrudate was chopped into pellets and injection molded at 470°-520° F. The results are shown in the Table.

| Example | Modifier | Parts | Notched Izod Impact str., ft./lb./in. | Gardner imp. str. in./lb. | Heat deflection temp., °C. |
|---|---|---|---|---|---|
| 1 | Epcar 306-G | 5 | nb* | >320 | 99 |
| 2 | | 10 | nb | >320 | 93 |
| 3 | | 15 | nb | >320 | 89 |
| 4 | Nordel 1560 | 5 | 3.4 | >320 | 92 |
| 5 | | 10 | nb | >320 | 94 |
| 6 | | 15 | nb | >320 | 92 |

*no break
>means greater than

EXAMPLES 7-19

A number of compositions were prepared with varying ratios of components, then molded and tested. The formulations were as follows:

| Ingredients, pts. by wt. | Example | | | | | | | | | | | | |
|---|---|---|---|---|---|---|---|---|---|---|---|---|---|
| | 7 | 8 | 9 | 10 | 11 | 12 | 13 | 14 | 15 | 16 | 17 | 18 | 19 |
| Polycarbonate of bisphenol-A and phosgene | 73 | 75.5 | 80 | 68 | 71 | 65.5 | 75.5 | 65.5 | 80 | 60 | 75 | 70 | 60 |
| Poly(ethylene terephthalate) | 19 | 19 | 15 | 23 | 23 | 30 | 20 | 26.5 | 18 | 38 | 15 | 28 | 30 |
| Rubbery copolymer of ethylene and propylene, Epcar 306-G | 7.9 | 5.4 | 5 | 10 | 5.8 | 3.9 | 3.9 | 7.9 | 2 | 2 | 10 | 2 | 10 |

The properties obtained were as follows:

| Property | Example | | | | | | | | | | | | |
|---|---|---|---|---|---|---|---|---|---|---|---|---|---|
| | 7 | 8 | 9 | 10 | 11 | 12 | 13 | 14 | 15 | 16 | 17 | 18 | 19 |
| Heat distortion temp., 264 psi, °C. | 114 | 113 | 117 | 110 | 113 | 110 | 114 | 111 | 117 | 107 | 116 | 108 | 101 |
| Notched Izod impact | | | | | | | | | | | | | |
| ⅛" ft. lbs./in. | — | 12.7 | 13.0 | 11.9 | 13.7 | 3.8 | 13.7 | 13.1 | 3.0 | 1.8 | 12.6 | 2.3 | 12.9 |
| ¼" ft. lbs./in. | 12.8 | 15.5 | 15.9 | 13.7 | 16.2 | 17.7 | 17.1 | 14.7 | 17.6 | 3.0 | 15.4 | 20.7 | 16.0 |
| Flexural modulus, psi × $10^5$ | 3.19 | 3.35 | 3.39 | 3.15 | 3.30 | 3.51 | 3.38 | 3.21 | 3.60 | 3.66 | 3.15 | 3.65 | 3.18 |
| Flexural strength psi × $10^4$ | 1.21 | 1.27 | 1.32 | 1.15 | 1.27 | 1.32 | 1.34 | 1.19 | 1.39 | 1.37 | 1.13 | 1.37 | 1.13 |
| Tensile modulus, psi × $10^5$ | 3.07 | 3.07 | 3.09 | 2.77 | 2.97 | 3.12 | 3.19 | 2.80 | 3.28 | 3.31 | 2.68 | 3.28 | 2.70 |
| Tensile strength psi × $10^3$ | 8.82 | 8.03 | 8.78 | 7.37 | 8.83 | 9.10 | 9.12 | 8.09 | 5.81 | 8.79 | 8.26 | 8.75 | 7.63 |
| Elongation, % | 110 | 88 | 97 | 98 | 113 | 122 | 108 | 110 | 89 | 111 | 106 | 101 | 120 |

EXAMPLES 20-22

This example illustrates the effect of polyolefin resin in combination with poly(bisphenol-A carbonate) resin in improving the impact strength of poly(ethylene terephthalate).

The molding compositions were prepared using 40 parts of poly(ethylene terephthalate), 60 parts of poly(- bisphenol-A carbonate) resin (General Electric Co.'s LEXAN®141), and various amounts of polyethylene (USI's Microthene FN-510) which are noted below, again in accordance with the procedure of Example 1.

TABLE 3

| Example | Amt. of polyethylene | Notched Izod str. ft./lbs./in. | Gardner str. in./lbs. | Heat deflection temp., °C. |
|---|---|---|---|---|
| 20 | 5 | 1.7 | >320 | 102 |
| 21 | 10 | 2.3 | >320 | 107 |
| 22 | 15 | 7.6 | >320 | 103 |

As can be seen, the notched impact strength increases dramatically with essentially no decrease in the heat deflection temperature.

EXAMPLES 23-25

These examples illustrate the impact strength improving effect of a vinyl addition polymer on poly(ethylene terephthalate) when added with a poly(bisphenol-A carbonate) resin, the vinyl polymer in this case being a random copolymer of ethylene and methyl acrylate (Gulf Chemical Co.'s EMA 2205).

All blends contained a 60:40 admixture of poly(bisphenol-A carbonate) resin and poly(ethylene terephthalate). The ethylene-methyl acrylate copolymer was added in the amounts shown below. Preparation was in accordance with Example 1.

TABLE 3

| Example | Amt. EMA | Notched Izod str., ft./lb./in. | Gardner str., in./lbs. | Heat deflection temp., °C. |
|---|---|---|---|---|
| 23 | 5 | 1.9 | >320 | 102 |
| 24 | 10 | 2.9 | >320 | 101 |
| 25 | 15 | nb | >320 | 97 |

EXAMPLES 26-37

Blends were prepared using 60 parts by weight of bisphenol-A polycarbonate (LEXAN®141, General Electric Co.), 40 parts by weight of poly(ethylene terephthalate) resin (Tenite 7741) and varying amounts (in parts by weight) of different types of polyethylene as shown. The ingredients were molded using a 3 ounce Newburg at 490° F. after extrusion on a 1.5 inch Killion machine at 450°-520° F.

| | Example | | | | | | | | | | | |
|---|---|---|---|---|---|---|---|---|---|---|---|---|
| | 26 | 27 | 28 | 29 | 30 | 31 | 32 | 33 | 34 | 35 | 36 | 37 |
| Low density polyethylene (USI's MN-722) | — | — | — | — | 5 | 10 | 15 | 20 | — | — | — | — |
| High density polyethylene (USI's LC-732) | 5 | 10 | 15 | 20 | — | — | — | — | — | — | — | — |
| Linear low density polyethylene (Union Carbide's UC-7144) | — | — | — | — | — | — | — | — | 5 | 10 | 15 | 20 |
| Properties | | | | | | | | | | | | |
| Notched Izod impact strength ft. lbs./in. (⅛") | 1.6 | 1.7 | 2.0 | 1.9 | 1.8 | 2.4 | 2.5 | 9.9 | 2.2 | 4.3 | 4.2 | 10.5 |
| Gardner impact strenght in. lbs. (⅛") | >320 | <8 | 24 | 24 | <8 | <8 | <8 | <8 | >320 | 38 | <8 | <8 |
| Heat distortion temp., °C. at 264 psi | 106 | 99 | 98 | 90 | 103 | 91 | 87 | 84 | 100 | 102 | 98 | 100 |

EXAMPLES 38-49

The procedure of Examples 26-37 was repeated to prepare formulations containing 75 parts by weight of bisphenol-A polycarbonate (LEXAN®141), 25 parts by weight of poly(ethylene terephthalate) (Tenite 7741) and various types of polyethylene as shown.

| | Example | | | | | | | | | | | |
|---|---|---|---|---|---|---|---|---|---|---|---|---|
| | 38 | 39 | 40 | 41 | 42 | 43 | 44 | 45 | 46 | 47 | 48 | 49 |
| Low density PE(MN-722) | 5 | 10 | 15 | 20 | — | — | — | — | — | — | — | — |
| High density PE(LC-732) | — | — | — | — | 5 | 10 | 15 | 20 | — | — | — | — |
| Linear low density PE(UC-7144) | — | — | — | — | — | — | — | — | 5 | 10 | 15 | 20 |
| Properties | | | | | | | | | | | | |
| Notched Izod Imp. str., ft. lbs./in. (⅛") | 12.5 | 10.7 | 11.5 | 18.8 | 2.7 | 3.2 | 3.3 | 3.1 | 12.1 | 10.9 | 9.7 | 18.7 |
| Gardner Imp. str., in. lbs. | >320 | >320 | <8 | <8 | >320 | >320 | >320 | >320 | >320 | 302 | 21 | 25 |

-continued

| | Example | | | | | | | | | | | |
|---|---|---|---|---|---|---|---|---|---|---|---|---|
| | 38 | 39 | 40 | 41 | 42 | 43 | 44 | 45 | 46 | 47 | 48 | 49 |
| (⅛") Heat distortion temp., °C. at 264 psi | 111 | 115 | 107 | 108 | 114 | 109 | 108 | 99 | 114 | 114 | 107 | 109 |

EXAMPLES 50-53

Flame retardant formulations in accordance with the invention were prepared in accordance with the procedure of Examples 26-37. The ingredients and properties are shown below.

| Example | 50 | 51 | 52 | 53 |
|---|---|---|---|---|
| Ingredients, pts. by wt. | | | | |
| Bisphenol-A polycarbonate (LEXAN 141) | 60 | 60 | 75 | 75 |
| Poly(ethylene terephthalate) (Tenite 7741) | 40 | 40 | 25 | 25 |
| Linear low density PE (UC-7144) | 15 | 20 | 15 | 20 |
| Saytex BT-93 | 10 | 10 | 10 | 10 |
| Antimony oxide | 3 | 3 | 3 | 3 |
| Properties | | | | |
| Notched Izod Imp. str., ft. lbs./in. (⅛") | 1.9 | 2.2 | 2.6 | 9.4 |
| Gardner imp. str., in. lbs. (⅛") | <8 | <8 | <8 | 9 |
| Heat distortion temp. °C. at 264 psi | 100 | 91 | 114 | 103 |
| UL-94 flammability rating | V-0 | V-2 | V-0 | V-0 |
| Average burn time, in seconds | 1.1 | 3.6 | 1.9 | 2.0 |

The above-mentioned patents and/or patents applications are incorporated herein by reference. Obviously, other modifications and variations of the present invention are possible in the light of the above teachings. For instance, instead of poly(ethylene terephthalate), poly(1,4-butylene terephthalate) can be substituted. It is, therefore, to be understood that changes may be made in the particular embodiments described above which are within the scope of the invention as defined in the appended claims.

I claim:

1. A thermoplastic molding composition comprising:
   (a) from about 15 to about 49 parts by weight of poly($C_{2-6}$ alkylene terephthalate) resin;
   (b) from about 51 to about 80 parts by weight of an aromatic polycarbonate resin; and
   (c) from about 5 to about 20 parts by weight of a polyolefin copolymer consisting of ethylene and propylene reaction products or ethylene, propylene and diene reaction products.

2. A composition according to claim 1 wherein said poly($C_{2-6}$ alkylene terephthalate) resin is poly(ethylene terephthalate).

3. A composition according to claim 1 wherein said olefin copolymer contains diene units.

4. A composition according to claim 1 wherein said polycarbonate resin is a poly(bisphenol-A carbonate).

5. A composition according to claim 1 which also includes (d) an additive selected from a fibrous reinforcing agent; a mineral filler, a stabilizer; a mold release agent; a dye; a pigment; a flame retardant; or a mixture of any of the foregoing.

6. A composition according to claim 1 wherein the polyolefin is an ethylene-propylene diene rubber.

7. A composition according to claim 1, which includes from about 0.01 to about 0.5 percent by weight of an organic phosphite.

8. A composition according to claim 1 wherein the polyolefin copolymer consists of ethylene and propylene reaction products.

* * * * *